Patented June 5, 1928.

1,672,587

UNITED STATES PATENT OFFICE.

JOHN T. TRAVERS, OF COLUMBUS, OHIO, ASSIGNOR, BY DIRECT AND MESNE ASSIGNMENTS, TO THE TRAVERS-LEWIS PROCESS CORPORATION, OF COLUMBUS, OHIO, A CORPORATION OF OHIO.

METHOD FOR PURIFYING SEWAGE AND INDUSTRIAL WASTE.

No Drawing. Application filed February 3, 1928. Serial No. 251,740.

This application constitutes a continuation in part of my co-pending application, Serial No. 190,657, filed May 11th, 1927.

This invention relates to a method for purifying polluted liquids containing organic matter, and has for its object the provision of a process by which the putrescible content of the liquid treated can be substantially entirely removed therefrom and a purified non-putrescible effluent produced.

The solid matter in polluted organic wastes is present in the liquid in three phases or forms, namely, in the form of suspensoids, crystalloids and colloids. The suspensoids represent the matter held in suspension in the liquid, the crystalloids represent the matter present in the liquid in true solution, while the colloidal matter is neither in suspension or true solution but is in a state of dispersion.

The suspended matter or suspensoids represent the least stable portion or fraction of the organic matter content of a polluted liquid and the removal thereof is not a difficult problem since suspensoids are readily susceptible to coagulation by the introduction to the liquid of suitable coagulating agents. Furthermore, they may be removed by filtration. While the removal of the normally suspended matter from a polluted liquid is essential to a purification process, its removal presents no difficult problem and while the process forming the subject matter of this invention effects a removal of the normally suspended matter from the liquid, no novelty is predicated on this feature of the process.

The crystalloids or matter in true solution represents only a very small per cent of the organic matter in the liquid, and this content affects only in an extremely small degree the putrescibility of the polluted liquid. Accordingly the removal of the crystalloids is not essential to an efficient purification process and this invention does not relate to their removal.

The removal of the colloidal matter from the liquid constitutes the important problem in the purification of polluted liquids and it is to a solution of this problem that the present invention specifically relates.

The colloidal matter in fresh domestic sewage contains in excess of 40% of the total organic and albuminoid nitrogenous matter in the sewage and this per cent increases as the sewage becomes septic. Since the organic and albuminoid bodies in a polluted liquid constitute the major portion of the putrescible matter therein, the importance of removing the colloidal fraction is at once apparent. The rapidity with which the dissolved oxygen of a stream receiving polluted liquids is consumed is directly traceable to the colloidal content of the polluted liquid. Ninety per cent of the biochemical oxygen demand of the colloidal fraction is a 24 hour demand and the entire demand is complete in 72 hours.

The bacteria present in polluted liquids are colloids and the removal of the colloids, therefore, frees the liquid from bacteria.

Since my process contemplates the removal of the colloids, a brief discussion of the chemistry of colloids follows:

I have determined that colloids are not isolated ions or molecules but aggregates of molecules, or ions and molecules, and lie between the point of suspension and the point of solution. They are neither in suspension nor solution but are in dispersion. Colloids migrate in an electrical field under the influence of an electrical current. It follows that they carry an electrical charge. When the hydroxyl ion concentration of a solution containing colloids has a pH value in the acid range, the sign of the colloid is positive and when the hydroxyl ion concentration of a solution has a pH value in the alkaline range, the sign of the colloid is negative. This phenomenon is due to the adsorption of H ions in the one case and OH ions in the other. It will thus be seen that the sign of a colloid may be changed by varying the hydroxyl ion concentration of the liquid to effect either an acid or alkaline reaction in the liquid. I have found that a colloid may be precipitated when the hydroxyl ion concentration of the solution has been increased sufficiently to cause the colloid to be completely negatively charged.

The precipitation of the colloids from the solution is effected in my process by the uniting or adsorption with a negatively charged colloid of positively charged ions which have been released as a result of the dissociation of an electrolyte producing material incorporated in the solution.

I have definitely ascertained that in order to effect a complete adsorption and precipitation of a negatively charged colloid by positively charged ions, the colloid must carry a complete negative charge. I have furthermore ascertained that various colloids carry various charges and that there is no uniformity in the charges which the different colloids will carry. It is essential to my process that the colloids carry a complete negative charge. By definitely controlling the hydroxyl concentration of the solution, a complete charging of the colloids can be effected. There are certain critical points in the hydroxyl concentration of a solution at which the greater percentage of the colloids present in the solution become completely charged. I find that only a minor portion of the colloids present in the solution will carry a complete negative charge when the solution has a hydroxyl ion concentration of less than pH 8, and that substantially all colloids present in the solution are completely charged when the hydroxyl ion concentration has been raised to pH 10. It is therefore evident that a definite relationship exists between the pH of the solution and the charges carried by the colloids in the solution. I attribute the complete charging of the colloids to the adsorption of OH ions by the colloids in the alkaline solution, this being a phenomenon of mass action. Since the pH constitutes a measure of the concentration of the H or OH ions, the higher the pH above 7, the greater is the mass action of the OH ions.

Since the various colloids have definite critical points at which they become fully charged and these points are not uniform, it follows that some of the colloids become completely charged when the solution has a hydroxyl ion concentration of a relatively low pH value, and that other colloids do not become completely charged until the pH of the solution has been raised to a substantially higher degree. It will be appreciated that when the solution has a pH in the acid range, the adsorption of OH ions by the colloids is due to their affinity for the OH ions, while, when the pH is in the alkaline range, the adsorption of the OH ions is effected due to force exerted by the mass action of the OH ions. The charging of the colloid is progressive. The sign of the colloid changes from positive to negative as the solution is changed from an acid reaction to an alkaline reaction. But, the colloid, even though carrying a negative sign, is not necessarily completely charged and capable of precipitation by the adsorption of the positive ions of an electrolyte. When the sign of the colloid has been changed to negative by changing the reaction of the solution, there no longer exists an affinity for the OH ions, but, on the contrary, the colloid repels the OH ion until such time as the force of the mass action is sufficiently great to overcome this repelling force and compel the adsorption of the OH ions in sufficient quantity to complete the negative charge of the colloid.

As previously pointed out, the precipitation of the colloid is effected by the adsorption thereby of the positively charged ions released from the dissociated electrolyte producing material. This adsorption occurs only when the colloid has attained a complete negative charge. Thus, the precipitation of the colloid is also dependent upon the control of the pH of the solution.

The adsorption of the positively charged ions of the electrolyte by the negatively charged colloids results in the neutralizing of the charge of the colloids to the isoelectric point when the stability of the colloid is destroyed and its form changed to that of a suspensoid. It is no longer in dispersion but in suspension and may thereafter be coagulated.

In the physical practice of the process, the pH of the solution is controlled by the incorporation in the solution of predetermined quantities of an alkali such as calcium hydroxide, while any one of a plurality of suitable electrolyte producing materials is employed to supply the positive ions for adsorption by the negatively charged colloids.

It has been determined that electrolyte producing materials to be suitable for use in carrying out my process must meet with certain definite specifications. First, an electrolyte producing material must have a predetermined degree of solubility. For the purpose of selecting suitable electrolyte producing materials, I have adopted a solubility index. The solubility index adopted by me, is the number of miligrams of salts calculated as calcium sulphate per gram of material which will dissolve in 200 cubic centimeters of carbon-dioxide-free distilled water at 25° C., in two minutes with constant shaking when using a one-half gram sample.

For the purpose of my process, a substance to constitute an electrolyte producing material must have a solubility index, ascertain as above, of at least 10. The higher the solubility index of a substance, the better and faster electrolyte it forms. Some electrolyte producing materials used by me have a solubility index above 200. A less amount of a substance having a higher solubility index is found to give superior results to those obtained when employing a substance having a relatively low solubility index. The electrolyte producing materials suitable for use in the process are further classified as salts of divalent or higher valent materials, whose ionization constants are equal to or greater than calcium sulphate, and the metallic ion of which is not precipitated in a solution having a hydroxyl ion concentration of pH 10.5. Calcium sulphate is considered as having an ionization constant of $6.1 \times 10^{-5}$. The following are specific examples of ionizable salts of metals of varying valence which constitute suitable electrolyte producing materials for carrying out the process:

Among the salts of the divalent metals are calcium sulphate, calcium chloride, barium chloride and strontium chloride; among the salts of trivalent metals are osmium chloride, thallium chloride, thallium sulphate and titanium chloride and among the salts of the quatravalent metals are thorium chloride, zirconium chloride and zirconium sulphate.

The reactions involving the precipitation of the colloids by means of an electrolyte are rather delicate. If insufficient electrolyte is added, only a partial precipitation is effected and if too great an excess of an electrolyte is used, there may be effected a partial peptization of the precipitate. In the latter case, the signs of the colloids are reversed, due to the mass action of the excess of positive ions released from the electrolyte resulting in a redispersion of the colloids in the liquid. The working range in the electrolyte limits is, however, sufficiently wide to permit of the effective precipitation of colloids by the use of an electrolyte.

When calcium sulphate is employed as the electrolyte producing material, it ionizes as follows:

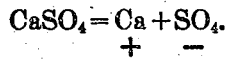

$$CaSO_4 = Ca + SO_4.$$

The positive metallic ion is adsorbed by the negative colloid, neutralizing the charge of the colloid to the isoelectric point and transforming its form to that of a suspensoid. Concurrently with this reaction, there occurs in the process a release of nascent oxygen, caused by the action of the released negative ions of the electrolyte on the water solution, as, for instance, when calcium sulphate is used to produce the electrolyte, the $SO_4$ ion unites with the water solution as follows:—

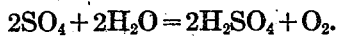

$$2SO_4 + 2H_2O = 2H_2SO_4 + O_2.$$

The amount of nascent oxygen produced is found to be in proportion to the amount of colloids in the sewage or industrial waste undergoing treatment. This I find to be due to a greater adsorption of the positive ions by the colloids, there being a larger amount of negative ions released for the reaction with the water solution. This nascent oxygen is an efficient purifying agent and assists in the destruction of bacteria and also supplies the effluent with a quantity of dissolved oxygen, reducing the oxygen demand and eliminating any necessity of re-aeration.

The amount of calcium hydroxide used in the treatment of any particular polluted liquid need be only sufficient to raise the hydroxyl ion concentration to the desired pH. Should it be found that the available dilution at a particular location necessitates only a partial purification of the liquid, this partial purification may be effected at a substantially lower cost than necessary for complete purification and the particular needs of the location thus economically supplied. For example, it may be found that adequate purification to meet the needs at a given location may be obtained by maintaining a hydroxyl ion concentration as low as pH 8 or 9. It will thus be seen that by regulating the quantity of calcium hydroxide employed, it is possible to obtain any desired pH. The quantity of the electrolyte producing material employed will be gauged in accordance with the pH of the liquid and will always be sufficient to supply an adequate number of positive ions for adsorption by all the colloids which are completely negatively charged at the pH of the solution. Since the lower the pH of the solution, the smaller the number of colloids completely charged, it follows that the lower the pH of the solution, the less quantity of electrolyte producing material needed. From the foregoing it is evident that any desired degree of purification can be effected and the reagents employed in just the amounts necessary to obtain the degree of purification required.

In most instances, a complete purification of the liquid will be required and in such instances, calcium hydroxide is added to the liquid to increase the hydroxyl concentration to from pH 10 to pH 11 and sufficient electrolyte producing material employed to supply the requisite number of positive ions for adsorption by all colloids in the liquid, since substantially all colloids will be completely negatively charged at these high pH values.

In my process a coagulant such as ferrous sulphate or aluminum sulphate is employed to coagulate and carry down the suspensoids naturally in the liquid representing the suspended matter originally therein, as well as to coagulate and carry down the suspensoids formed as a result of the neutralization of the charges of the colloids in the liquid by the adsorption of the positive ions of the electrolyte.

The use of a coagulant is important first because it eliminates the necessity for filtration; second and of primary importance, it permits a quick separation of the supernatent liquid or effluent from the sludge, thus avoiding any tendency to peptization which might otherwise occur as a result of continued ionization of any excess of the electrolyte producing material which has been introduced to the liquid and accumulated with the sludge. To avoid peptization, adequate quantities of the coagulant are used to effect rapid flocculation and settling of the precipitate and the effluent is drawn off immediately following or soon after complete settling of the precipitate. In actual practice, the effluent may be discharged from the upper levels of the liquid body while settling is still occurring at the lower levels. It will be appreciated that peptization would not occur provided the electrolyte were introduced in the exact amount necessary to only supply positive ions for the colloids, but in practice such exact control is found to be uneconomical and is unnecessary.

A suitable mix for use in my process, it will be observed, should contain three important ingredients, namely, calcium hydroxide, a suitable electrolyte producing material, and a coagulant.

These three ingredients are preferably combined and introduced to the liquid in commingled form. The electrolyte producing material usually represents in excess of 50% of the total mix while the coagulant seldom exceeds 15% of the total mix. The quantity of calcium hydroxide used will depend on the initial pH of the liquid and the increase in pH desired and as previously set forth, the quantity of electrolyte producing material is gauged according to the pH of the liquid. The total quantity of the mix to be used can be determined by making trial tests and noting the increase in the pH of the solution, the rapidity of precipitation, the size of the floc, and the degree of clarification. The limits of the mix for ordinary polluted liquids may be said to be between 3 and 15 pounds per 1,000 gallons of liquid treated. Exceedingly concentrated industrial waste liquors, like cannery waste liquor, may require larger amounts.

The following illustrated treatment of domestic sewage is given. In this instance, calcium sulphate was the electrolyte producing material employed while ferrous sulphate was used as a coagulant. The mix was used in the proportion of 4.6 pounds per 1,000 gallons of sewage. The composition of the mix was substantially as follows:—

|  | Per cent. |
|---|---|
| Calcium hydroxide | 34.8 |
| Calcium sulphate | 52.2 |
| Ferrous sulphate | 13 |

A typical municipal sewage from Columbus, Ohio, was treated, this sewage showing the following analysis:—

| Total solids | 1663 | P.P.M. |
|---|---|---|
| Total organic matter | 497 | P.P.M. |
| Suspended matter | 994 | P.P.M. |
| Organic suspended matter | 302 | P.P.M. |
| Organic nitrogen | 16.0 | P.P.M. |
| Albuminoid nitrogen | 4.0 | P.P.M. |
| Dissolved oxygen | .2 | P.P.M. |
| 10 day biochemical oxygen demand at 20° C. | (412) | |
| Total bacteria | 1,700,000 | per C.C. |
| B. coli | 290,000 | per C.C. |

In treating the sewage, it was stirred or mildly agitated to distribute the treating agents uniformly through the liquid. The precipitated or coagulated solids were permitted to settle.

Upon analysis, the clarified effluent was found to show the following:—

| Total solids | 850 | P.P.M. |
|---|---|---|
| Total organic matter | 70 | P.P.M. |
| Suspended matter | 8 | P.P.M. |
| Organic suspended matter | 5 | P.P.M. |
| Organic nitrogen | 4.0 | P.P.M. |
| Albuminoid nitrogen | 1.2 | P.P.M. |
| 10 day biochemical oxygen demand at 20° C. | 24 | P.P.M. |
| Total bacteria | 800 | per C.C. |
| B. coli | 8 | per C.C. |

From the foregoing description it is evident that I have provided a novel process for purifying putrescible liquids, through the medium of which any desired degree of purification may be effected to meet the particular demands of any particular locality in a very efficient and economical manner. The process enables the removal of the exceedingly putrescible colloidal content of the liquid and affords a control by which its removal can be effected without danger of redispersion of the colloids through the liquid due to peptization.

The expression "a suitable electrolyte producing material" as employed in the claims, is intended to include only substances conforming with the definite specifications hereinabove set forth.

It is to be understood that the foregoing description is merely illustrative and is not to be construed in a limited sense. The process is susceptible to variations necessary to adapt it to the treatment of different polluted liquids containing organic matter in colloidal form and to meet the requirements necessitated by limitations in available dilution in different localities.

Having described my invention, what I claim is:—

1. A method for purifying polluted liquids comprising increasing the hydroxyl ion concentration of the liquid to a degree sufficient to force substantially all colloids present in the liquid to become completely negatively charged, and incorporating in the liquid a suitable electrolyte producing material.

2. A method for purifying polluted liquids and separating therefrom putrescible matter in the liquid in colloidal form, comprising maintaining the hydroxyl ion concentration of the liquid intermediate the pH value 8 and the pH value 11, and incorporating in the liquid a suitable electrolyte producing material.

3. A method for purifying polluted liquids, comprising increasing the hydroxyl ion concentration of the liquid to a degree sufficient to force substantially all colloids present in the liquid to become completely negatively charged, and incorporating in the liquid a suitable electrolyte producing material and a coagulant.

4. A method for purifying polluted liquids and removing putrescible matter present in the liquid in colloidal form, comprising incorporating in the liquid a suitable electrolyte producing material to supply positive ions for adsorption by negatively charged colloids, the adsorption of the positive ions being accompanied by a release of negatively charged ions which react with the water of the solution, releasing nascent oxygen, and controlling the adsorption of the positive ions by the colloids and the release of nascent oxygen by controlling the hydrozyl ion concentration of the solution.

5. A method for treating liquids to separate colloids therefrom, comprising introducing a suitable electrolyte producing material to the liquid to precipitate the colloids, coagulating the colloids, and maintaining the time period of contact between the liquid and the electrolyte producing material such that re-dispersion of precipitated colloidal matter by peptization is avoided.

6. A method for treating liquids to separate colloids therefrom, comprising introducing to the liquid a suitable electrolyte producing material to precipitate the colloids, incorporating in the liquid an adequate supply of a suitable coagulant to effect rapid coagulation and settling of the precipitate, and separating the clarified effluent from the precipitate prior to re-dispersion of the colloidal matter due to peptization.

7. A method for purifying sewage and industrial waste comprising transforming the material undergoing treatment from an acid condition to an alkaline condition to effect a change in the sign of positive colloids to negative colloids, and the introduction to the material undergoing treatment of an electrolyte to supply positive ions to unite with the colloids not substantially in excess of the amount necessary to neutralize the charge of the colloids, thus destroying their stability.

8. A method for treating sewage and industrial waste comprising introducing thereto an alkali to effect a change in the sign of a positive colloid to a negative colloid and the addition to the material undergoing treatment of calcium sulphate to supply positive ions to unite with the colloids not substantially in excess of the amount necessary to neutralize the charge of the colloids, thus destroying their stability.

9. A method for treating polluted liquids containing putrescible matter in colloidal form comprising introducing thereto an alkali in an amount sufficient to cause the colloids present in the liquid to carry a negative charge, incorporating in the liquid undergoing treatment calcium sulphate sufficient to supply positive ions to unite with the colloids but not substantially in excess of the amount necessary to neutralize the charge of the colloids, thus transforming the colloids into suspensoids, and incorporating in the liquid a suitable coagulant.

10. A method for purifying a polluted liquid comprising reacting upon such polluted liquid with a reagent capable of precipitating the colloidal and finely suspended contents of said liquid while effecting a liberation of a supplemental purifying agent, said supplemental purifying agent constituting nascent oxygen, permitting this agent to act upon the body of the liquid to effect further purification thereof and coagulating said precipitated matter to facilitate the removal thereof.

11. The process defined in claim 10, in which the supplemental purifying agent is employed in situ, the quantity of which increases with an increase in the colloidal and suspended matter content of the sewage and industrial waste.

12. A method for purifying a polluted liquid comprising reacting upon such polluted liquid with a reagent adapted to change the colloids present in the polluted liquid to suspensoids and effect a liberation of nascent oxygen, permitting the nascent oxygen to act upon the liquid to effect a further purification thereof and coagulating the suspensoids.

13. A method for purifying a polluted liquid comprising reacting upon the liquid with a substance capable of producing a relatively large number of ions of a given charge, the charges produced by one portion of the reagent causing the conversion of the colloids present in the polluted liquid to suspensoids, the other portion of the reagent producing nascent oxygen, permitting this nascent oxygen to act upon the liquids to effect a further purification thereof and coagulating the suspensoids.

14. A method for purifying polluted liquids such as sewage and industrial waste comprising reacting upon such polluted liquid with a reagent including an ionizable salt compound of a strong base forming element, effecting a transformation of colloids in the liquid to suspensoids while liberating nascent oxygen, permitting said nascent oxygen to act upon the liquid to effect further purification thereof and coagulating the said suspensoids.

15. A method for purifying sewage and industrial waste which comprises reacting upon such material with calcium sulphate to precipitate the colloidal and finely suspended contents of said material, while effecting a liberation of nascent oxygen, permitting the nascent oxygen to act upon the body of the material to effect further purification thereof and coagulating the precipitated matter.

16. A method for producing an effluent characterized by its high content of dissolved oxygen from sewage and industrial wastes containing putrescible matter in colloidal form comprising introducing to the sewage or industrial waste an alkali and a suitable electrolyte adapted to dissociate and supply negatively charged ions which react with the water of the solution to form nascent oxygen which is dissolved in the effluent.

17. A method for effecting any desired degree of purification of a putrescible liquid containing putrescible matter in colloidal form, comprising incorporating in the liquid a suitable electrolytic producing material and an alkali in an amount sufficient to increase the hydroxyl ion concentration of the liquid only to such pH value as will cause a complete negative charge to be carried by the approximate number of colloids necessary to be removed to effect the requisite degree of purification.

JOHN T. TRAVERS.